Patented Oct. 16, 1934

1,977,210

UNITED STATES PATENT OFFICE

1,977,210

PROCESS FOR THE PREPARATION OF THIOUREA

Wilhelm Schulenburg, Frankfort-on-the-Main, Germany, assignor, by mesne assignments, to E. I. du Pont de Nemours and Company, a corporation of Delaware No Drawing. Application August 29, 1930, Serial No. 478,801. In Germany September 14, 1929

3 Claims. (Cl. 260—125)

This invention relates to a process for the preparation of thiourea, and more particularly to its preparation from a cyanamide and hydrogen sulfide in the presence of carbon dioxide.

Heretofore, thiourea has been made from hydrogen sulfide and cyanamide or its alkaline earth metal salts, such as calcium cyanamide, by reacting these in the presence of a water soluble base, for example, ammonia. The hydrogen sulfide is used as such, if alkaline reacting ammonium compounds are present, or it may be used in the form of ammonium sulfide.

The object of this invention is to insure increased yields of high grade thiourea from hydrogen sulfide and a cyanamide at a lower cost and with less damage to individuals and equipment connected with the process than is generally the case when ammonia is used.

It has now been found that a cyanamide, such as calcium cyanamide, will react readily with hydrogen sulfide in the presence of carbon dioxide in aqueous solution to form a solution of thiourea. It is preferred that the reaction be carried out at a low temperature, that is at a temperature lower than ordinarily used for this reaction, for example below 40° C. and preferably at temperatures maintainable by using ice as a cooling medium, for example temperatures below substantially room temperature. The temperature is kept from rising above this so-called "low temperature" by application of a cooling medium thereby neutralizing the heat of reaction as generated.

The following example will serve to illustrate the invention. However, the invention is not to be limited to this specific example, since it may be carried out in other forms and under varying conditions.

Example

A mixture of 1 part of calcium cyanamide with 4 parts of ice water is treated, either before or after filtering and while the container is being kept cool by such externally applied additional ice as is necessary, with carbon dioxide and hydrogen sulfide gases. The calcium cyanamide carbonate which is first formed is decomposed by the hydrogen sulfide to form thiourea, which can then be recovered by acidifying the solution and concentrating it under a vacuum until crystallization occurs.

The carbon dioxide and hydrogen sulphide may be added simultaneously or one after another, and the addition carried out in a continuous or intermittent fashion. The reaction may be conducted either under ordinary or increased pressures.

The thiourea may be recovered from the other reaction products by filtering the solution, if necessary, and thereafter making the solution weakly acid with an organic or inorganic acid, filtering out the sulphur, and then concentrating the solution under a vacuum. As the concentration proceeds, crystallization will occur and the product can be recovered by filtration or the liquid may be completely evaporated and the solid collected.

The thiourea is obtained with yields greater than 87% of the theoretical.

Having now particularly described my invention what I desire to claim is:

1. A process for the preparation of thiourea comprising introducing carbon dioxide into an aqueous solution of calcium cyanamide to form calcium cyanamide carbonate, introducing hydrogen sulfide into the reaction mixture while maintaining the temperature between about room temperature and the temperature of melting ice and thereafter acidifying the solution, removing insoluble materials by filtration, and recovering the thiourea by evaporation of the filtrate under a subatmospheric pressure.

2. A process for the preparation of thiourea comprising simultaneously introducing carbon dioxide and hydrogen sulphide into an aqueous solution of calcium cyanamide maintained at a temperature between room temperature and the temperature of melting ice by the application of a cooling medium and thereafter acidifying the solution, removing insoluble materials by filtration and evaporating the filtrate to recover the thiourea.

3. A process for the preparation of thiourea comprising introducing hydrogen sulfide into an aqueous solution of calcium cyanamide in the presence of carbon dioxide, said solution being maintained at a temperature between room temperature and the temperature of melting ice, and thereafter acidifying the solution, removing insoluble material by filtration and evaporating the filtrate to recover the thiourea.

WILHELM SCHULENBURG.